Figure 1:
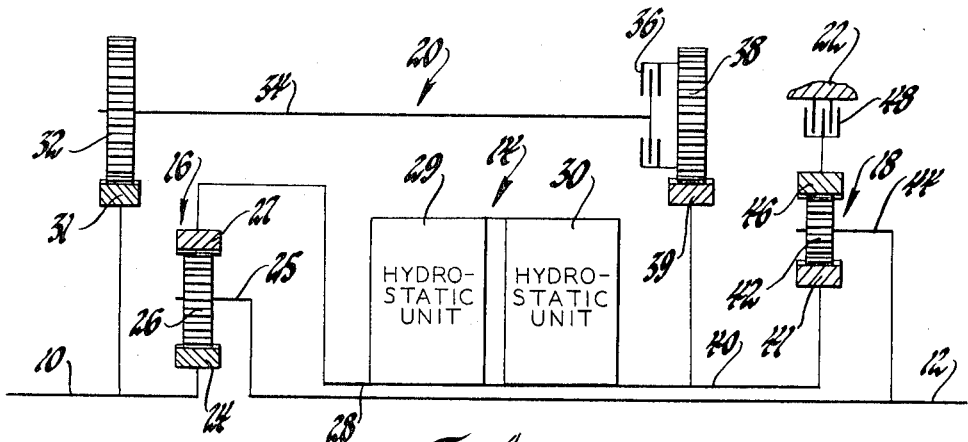

United States Patent

[11] 3,592,077

| [72] | Inventor | James C. Polak<br>Indianapolis, Ind. |
|---|---|---|
| [21] | Appl. No. | 855,223 |
| [22] | Filed | Sept. 4, 1969 |
| [45] | Patented | July 13, 1971 |
| [73] | Assignee | General Motors Corporation<br>Detroit, Mich. |

[54] HYDROMECHANICAL TRANSMISSION
7 Claims, 3 Drawing Figs.

| [52] | U.S. Cl. | 74/687 |
|---|---|---|
| [51] | Int. Cl. | F16h 47/04 |
| [50] | Field of Search | 74/687, 720.5 |

[56] References Cited
UNITED STATES PATENTS

| 3,446,093 | 5/1969 | Orshansky, Jr. | 74/687 |
|---|---|---|---|
| 3,455,183 | 7/1969 | Orshansky, Jr. | 74/687 |

*Primary Examiner*—Leonard H. Gerin
*Attorneys*—W. E. Finken, A. M. Heiter and R. L. Phillips ABSTRACT: A hydromechanical transmission comprising planetary gearing dividing input power between the transmission output and a variable speed ratio hydrostatic drive train having a pair of operatively hydraulically connected variable displacement hydrostatic units to provide a low speed range drive between the transmission input and output and the same planetary gearing combining power from the transmission input and the hydrostatic drive train to provide a high speed range drive between the transmission input and output with the speed ratio in both speed range drives varied by varying the hydrostatic drive train speed ratio with shifting between drives provided by devices which are speed synchronized for engagement at a predetermined transmission input-output speed ratio.

PATENTED JUL 13 1971 3,592,077

INVENTOR.
James C. Polak
BY
Ronald L. Phillips
ATTORNEY

HYDROMECHANICAL TRANSMISSION

This invention relates to hydromechanical transmissions and more particularly to vehicular hydrostatic-mechanical transmissions providing a plurality of speed range drives.

The use of a variable ratio hydrostatic drive unit in a vehicular transmission offers the advantages of controlled, infinitely variable speed and torque ratios within limited ranges. It is also well known that these ranges can be extended by combining gearing generally of the planetary type with the hydrostatic drive unit and that further advantages can be obtained by employing a split power path, one path being hydraulic and the other being mechanical with increased efficiency resulting from the use of the mechanical power path. Furthermore, it is known that a shift between drives can be accomplished by a friction drive establishing device that is speed synchronized for engagement at a predetermined transmission input-output speed ratio.

There are basically two types of split power drive, one type being an input-split-power drive and the other being an output-split-power drive. There also may be a combination of these two types of split power drives to provide a compound split power drive. All of these drives are fully described in copending U.S. Pat. application Ser. No. 675,383 filed Oct. 16, 1967, by William G. Livezey, now U.S. Pat. No. 3,470,769, and entitled "Input-Split-Power, Output-Split-Power, Compound-Split-Power, Power Train." Conventional practice is to have separate planetary gearing provide for these two basically different types of split power drives.

The hydromechanical transmission according to the present invention provides the two basic types of split power drives wherein the same planetary gearing divides power to provide a low speed range input-split-power drive and combines power to provide a high speed range output-split-power drive. With such minimum planetary gearing for the type and number of drives, there results a simple, low cost arrangement.

In one embodiment according to the present invention, the transmission input shaft is connected to the sun gear of a power divider-power combiner planetary gear set. This gear set additionally has a carrier which is connected to the transmission output shaft and a ring gear which is drivingly connected to one of two hydraulically connected variable displacement hydrostatic units; the hydrostatic units providing a variable speed ratio hydrostatic drive train. The input shaft is selectively connected by a clutch to drive the other hydrostatic unit. This other hydrostatic unit is connected to the sun gear of a speed reducer-torque multiplier gear set. This latter gear set additionally has a carrier which is connected to the transmission output shaft and a ring gear which may be held by a brake. A low speed range drive is provided by engaging only the brake. This conditions the transmission for input split power drive with the power splitter-power combiner gear set dividing input power between the output shaft and the hydrostatic drive train while the other gear set provides the desired speed reduction-torque multiplication between the hydrostatic drive train and the transmission output shaft. In this low speed range drive, the transmission speed ratio is varied by varying the speed ratio of the hydrostatic drive train. At a predetermined input-output ratio, there occurs no relative speed between the members of the clutch and thus an upshift may be accomplished by disengaging the brake and engaging the clutch at this shift point. This switches power input from the one hydrostatic unit to the other. With the sun gear of the power divider-power combiner gear set being input driven, the power divider-power combiner gear set acts as a power combiner by combining power from the input shaft and the hydrostatic drive train to provide a high speed range drive, the other gear set not being in either of these power paths but providing for speed synchronizing the brake for a downshift at this same input-output speed ratio. In the high speed range drive, the speed ratio is again varied by varying the speed ratio of the hydrostatic drive train.

An object of the present invention is to provide a new and improved hydromechanical transmission.

Another object is to provide a hydromechanical transmission providing an input-split-power drive and an output-split-power drive using the same planetary gearing for both power splits.

Another object is to provide a hydromechanical transmission having an arrangement of planetary gearing and a variable ratio hydrostatic drive train such that the planetary gearing divides input power between the transmission output and a hydrostatic drive train in one speed range drive with power flowing in one direction through the hydrostatic drive train and this same gearing combines the power from the hydrostatic drive train and the transmission input in another speed range drive with power flowing in the opposite direction through the hydrostatic drive train.

Another object is to provide a hydromechanical transmission having planetary gearing dividing transmission input power between the transmission output and a hydrostatic drive train to provide a low speed range output-split-power drive and the same gearing on an upshift combining power from the hydrostatic drive train and the transmission input to provide a high speed range output-split-power drive with each drive established on engagement of a single drive establishing device which is speed synchronized at a predetermined input-output speed ratio.

These and other objects of the present invention will be more apparent from the following description and drawing in which:

FIG. 1 diagrammatically shows one embodiment of the hydromechanical transmission according to the present invention.

Figure 2:
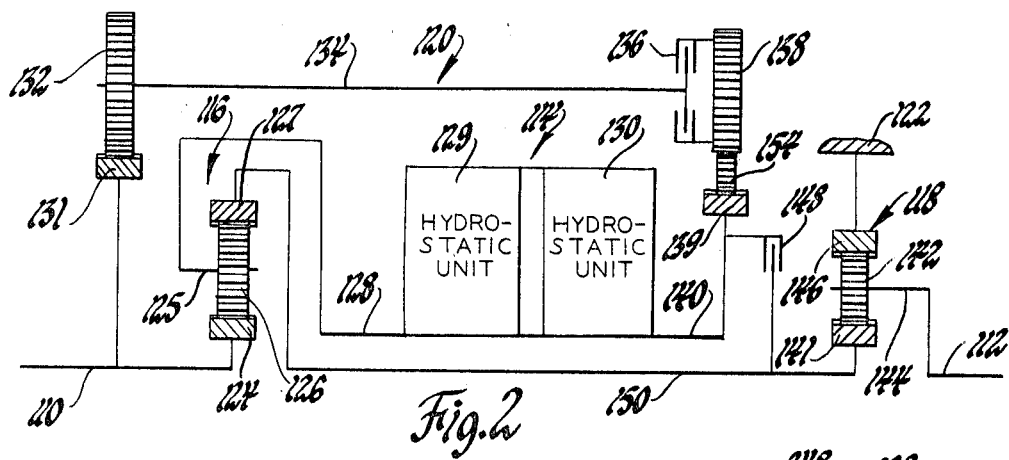

FIG. 2 diagrammatically shows another embodiment of the hydromechanical transmission according to the present invention.

Figure 3:
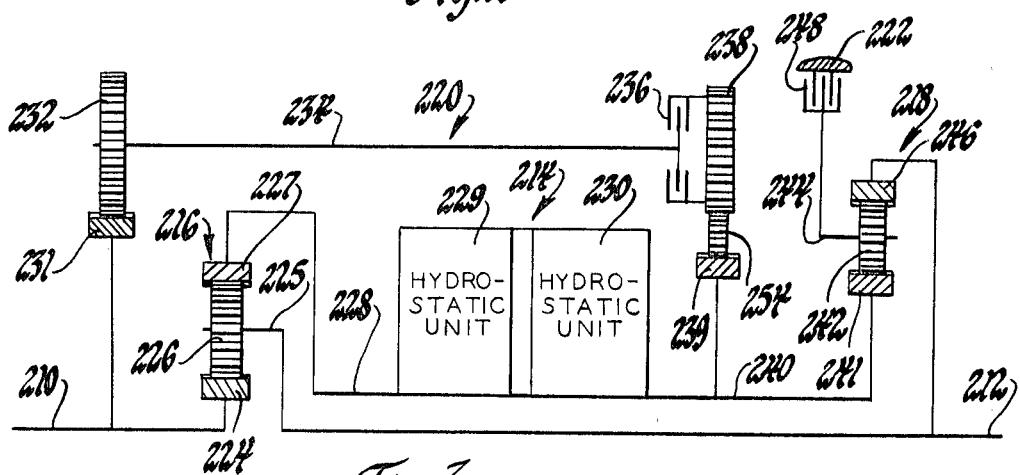

FIG. 3 diagrammatically shows a third embodiment of the hydromechanical transmission according to the present invention.

FIG. 1 TRANSMISSION ARRANGEMENT

Referring first to FIG. 1 of the drawing, there is shown a hydromechanical transmission generally comprising a transmission input shaft 10 operatively drivingly connected to a transmission output shaft 12 by a hydromechanical arrangement having a variable speed ratio hydrostatic drive train 14, planetary gear sets 16 and 18 and a mechanical drive train 20. All of the components are suitably supported in a transmission housing generally designated at 22 with the input shaft 10 adapted for connection to an engine and the output shaft 12 adapted for connection by a final drive train to the vehicle's driving wheels. The central axes of the components 10, 12, 14 16 and 18 are aligned and the hydrostatic drive train 14 is arranged intermediate the two gear sets to provide a compact transmission arrangement characterized by the short length.

Describing now the details of the hydromechanical arrangement, the input shaft 10 is connected to sun gear 24 of gear set 16. A carrier 25 is connected to the transmission output shaft 12 and carries pinions 26 which mesh with sun gear 24. Pinions 26 also mesh with ring gear 27 which is connected by a sleeve shaft 28 to hydrostatic unit 29 of the hydrostatic drive train 14, the hydrostatic unit 29 acting as a pump in one condition and as a motor in another condition as described in more detail later. The input shaft 10 is selectively connectable by the mechanical drive train 20 to the other hydrostatic unit 30 of the hydrostatic drive train 14.

The mechanical drive train 20 comprises a spur gear 31 which is connected to the transmission input shaft 10 at a point leftward of gear set 16. Gear 31 meshes with a spur gear 32 connected to the left-hand end of a countershaft 34. The shaft 34 is connected at its right-hand end by engagement of a clutch 36 to a spur gear 38. Gear 38 meshes with a spur gear 39 which is connected to a sleeve shaft 40. Shaft 40 connects gear 39 to hydrostatic unit 30 and in addition connects this hydrostatic unit to sun gear 41 of gear set 18. Sun gear 41 meshes with pinions 42 carried by a carrier 44 which is connected to the transmission output shaft 12. Pinions 42 also mesh with a ring gear 46 which may be held by engagement of a brake 48.

Both of the hydrostatic units 29 and 30 have variable displacement and are of a conventional type. Thus, with power input to hydrostatic unit 29 and by controlling the hydrostatic units' displacements, the other hydrostatic unit 30 can be caused to drive shaft 40 from 0 speed in a hydraulically locked condition to some maximum speed in either direction. Alternatively, with power input to hydrostatic unit 30 and by controlling the hydrostatic units' displacements, the hydrostatic unit 29 can be caused to drive the shaft 28 from 0 speed in a hydraulically locked condition to some maximum speed in either direction. Both the brake and clutch, which are frictional drive establishing devices, are conventional and together with the hydrostatic drive train, may be operated in any known way, e.g. electrically, hydraulically, pneumatically, or by some mechanical provision and according to a certain schedule.

FIG. 1 TRANSMISSION OPERATION

The hydromechanical transmission shown in FIG. 1 may be operated to provide a low and a high-speed range forward drive and the same low speed range drive in reverse with the speed ratio between transmission input and output in each drive made infinitely variable by the variable speed ratio drive of the hydrostatic drive train.

Neutral is provided by disengaging or releasing all the drive establishing devices. This disconnects all power paths between the transmission input and output and thus no drive can be transmitted therebetween.

Low speed range forward drive is established by engaging only brake 48 to hold ring gear 46 of gear set 18. In this transmission condition the gear set 16 operates as a power divider in that it divides input power between the output shaft 12 and the hydrostatic drive train 14. With power into hydrostatic unit 29 it operates as a pump to drive the other hydrostatic unit 30 which then operates as a motor with the gear set 18 providing the desired speed reduction-torque multiplication between the hydrostatic drive train 14 and output shaft 12. For ease in understanding, it will be assumed throughout the description of operation that transmission input speed remains constant. In the low speed range drive, 0 output speed is obtained when the displacement of hydrostatic unit 30 is at its maximum value and the displacement of hydrostatic unit 29 is at 0. To increase transmission output speed, the displacement of hydrostatic unit 29 is increased so that hydrostatic unit 30 drives shaft 40 in the same direction as input shaft 10 which direction will be described as the forward direction. Since ring gear 46 is braked, the carrier 44 and connected output shaft 12 are thus driven in the forward direction at a reduced speed relative to the driving sun gear 41 by the input-split-power drive. When maximum displacement of hydrostatic unit 29 is reached, transmission output speed is thereafter increased by decreasing the displacement of hydrostatic unit 30 to 0.

Low speed range reverse drive is established in the same manner as the low speed range forward drive, the only difference being that the displacement of hydrostatic unit 29 is controlled to provide for hydrostatic unit 30 to drive sun gear 41 in the opposite or reverse direction. The type of power flow has not been changed and thus the low speed range reverse drive is also an input-split-power drive.

At the upper speed limit of the low speed range forward drive with hydrostatic unit 30 at 0 displacement and hydrostatic unit 29 at maximum displacement, the driven members of clutch 36 are driven by shaft 40 through gears 39 and 38 in the same direction that the drive member of this clutch is being driven by the input shaft 10 through gears 31 and 32. This arrangement enables the sizes of the operating gears to be selected so that at a predetermined input-output speed ratio, the drive and driven members of the clutch 36 have no speed difference, i.e. are speed synchronized.

An upshift from the low speed range forward drive to the high speed range forward drive is preferably accomplished when the above speed synchronized condition of clutch 36 is reached. The brake 48 is then engaged and the clutch 36 is released. This switches the transmission input drive from hydrostatic unit 29 to hydrostatic unit 30 which then operates as a pump to drive hydrostatic unit 29. Hydrostatic unit 29 then operates as a motor and drives ring gear 27 of gear set 16. With sun gear 24 being input driven in the forward direction, gear set 16 operates as a power combiner in that it combines power from the hydrostatic drive train and input shaft to provide an output-split-power drive to drive the transmission output shaft 12. Output speed in the high-speed range forward drive is increased by increasing the displacement of hydrostatic unit 30 and decreasing the displacement of hydrostatic unit 29. The gear set 18 is not in either of these power paths but does provide for speed synchronizing brake 48 for a downshift at the same predetermined input-output speed ratio which condition occurs at 0 displacement of hydrostatic unit 30 and maximum displacement of hydrostatic unit 29 in the high-speed range drive.

FIG. 2 TRANSMISSION ARRANGEMENT

In the FIG. 2 transmission arrangement, the input shaft 110 is connected to sun gear 124 of the power divider-power combiner planetary gear set 116. The ring gear 127 of this gear set is connected to an intermediate shaft 150. Pinions 126 are carried by carrier 125 which is connected by sleeve shaft 128 to variable displacement hydrostatic unit 129 of the variable speed ratio hydrostatic drive train 114. The other variable displacement hydrostatic unit 130 is connected to shaft 140 which may be connected by engagement of a clutch 148 to the intermediate shaft 150.

Input shaft 110 is also connected to spur gear 131 which meshes with spur gear 132. Gear 132 is connected to the left-hand end of countershaft 134 of the mechanical drive train 120. The shaft 134 may be connected by engagement of clutch 136 to spur gear 138 which meshes with an idler gear 154. Idler gear 154 meshes with a spur gear 139 which is connected by sleeve shaft 140 to drive hydrostatic unit 130.

The intermediate shaft 150 is connected to sun gear 141 of the speed reducer-torque multiplier planetary gear set 118. Pinions 142 mesh with sun gear 141 and are carried by carrier 144 which is connected to transmission output shaft 112. Pinions 142 also mesh with ring gear 146 which is permanently grounded to the transmission housing 122.

FIG. 2 TRANSMISSION OPERATION

The FIG. 2 transmission arrangement may be operated in the same manner as the FIG. 1 transmission arrangement described above to provide a low and a high-speed range forward drive and a low speed range reverse drive, the clutch 148 being engaged for the low speed range drives and clutch 136 being engaged for the high-speed range drive. In the FIG. 2 arrangement, the interposition of the idler gear 154 in the mechanical drive train offsets the different drive direction to the hydrostatic drive train provided by this arrangement of the power divider-power combiner gear set as compared with that in FIG. 1.

FIG. 3 TRANSMISSION ARRANGEMENT

In the FIG. 3 transmission arrangement, the transmission input shaft 210 is connected to sun gear 224 of the power divider-power combiner planetary gear set 216. The carrier 225 of this gear set is connected to the transmission output shaft 212. Pinions 226 carried by carrier 225 mesh with sun gear 224 and ring gear 227 which is connected by sleeve shaft 228 to variable displacement hydrostatic unit 229 of the variable speed ratio hydrostatic drive train 214. The other variable displacement hydrostatic unit 230 is connected by sleeve shaft 240 to sun gear 241 of the speed reducer-torque multiplier planetary gear set 218. Sun gear 241 meshes with pinions 242 carried by carrier 244. Pinions 242 also mesh with ring gear 246 which is connected to the transmission output shaft 212. The carrier 244 may be held by engagement of a brake 248 and when thus held, the ring gear 246 is driven by sun gear 241 at a reduced speed in the opposite direction relative thereto.

In the mechanical drive train 220, the input shaft 210 is connected to spur gear 231 which meshes with spur gear 232. Gear 232 is connected to countershaft 234 which may be connected by engagement of clutch 236 to spur gear 238. Gear 238 meshes with idler gear 254 and this idler gear meshes with spur gear 239 which is connected by shaft 240 to hydrostatic unit 230.

FIG. 3 TRANSMISSION OPERATION

The FIG. 3 hydromechanical transmission arrangement may be operated like the FIG. 1 transmission arrangement described above to provide a low and a high-speed range forward drive and also a low speed range reverse drive, the brake 248 being engaged for the low speed range drives and clutch 236 being engaged for the high-speed range drive. In the FIG. 3 arrangement, the interposition of the idler gear 254 in the mechanical drive train offsets the reversal in drive direction provided by this arrangement of the speed reducer-torque multiplier gear set as compared with that in FIG. 1.

The above described embodiments are illustrative of the invention which may be modified within the scope of the appended claims.

I claim:

1. In a transmission the combination of an input shaft; an output shaft; variable speed ratio hydrostatic drive means comprising a pair of operatively hydraulically connected variable displacement hydrostatic units; planetary gear means having one member drivingly connected to said input shaft, a second member drivingly connected to one of said hydrostatic units and a third member drivingly connected to said output shaft; first mechanical drive means including selectively operable first drive establishing means for selectively drivingly connecting the other hydrostatic unit to said output shaft whereby said planetary gear means divides input shaft power between said hydrostatic drive means and said output shaft to provide a first speed range drive between said input shaft and said output shaft; and second mechanical drive means including selectively operable second drive establishing means for selectively drivingly connecting said input shaft to said other hydrostatic unit whereby said planetary gear means combines power from said input shaft and said hydrostatic drive means to provide a second speed range drive between said input shaft and said output shaft and whereby the speed ratio in both said speed range drives is varied by varying the speed ratio of said hydrostatic drive means.

2. The transmission set forth in claim 1 and said first mechanical drive means further including planetary gear means responsive to operation of said first drive establishing means to effect the drive connection between said other hydrostatic unit and said output shaft, said second mechanical drive means including a gear train, said second drive establishing means comprising a clutch which is operable on engagement to establish drive through said gear train to effect the drive connection between said input shaft and said other hydrostatic unit.

3. The transmission set forth in claim 1 and said first drive establishing means comprising a clutch which is operable on engagement to effect the drive connection between said other hydrostatic unit and said output shaft, said second mechanical drive means including a gear train, said second drive establishing means comprising a clutch which is operable on engagement to establish drive through said gear train to effect the drive connection between said input shaft and said other hydrostatic unit.

4. The transmission set forth in claim 1 and said one member being a sun gear, said second member being a ring gear and said third member being a carrier carrying a pinion meshing with the sun gear and ring gear.

5. The transmission set forth in claim 3 and said one member being a sun gear, said third member being a ring gear and said second member being a carrier carrying a pinion meshing with the sun gear and ring gear, said first mechanical drive means including permanently grounded planetary gear means through which there is provided both the drive connection between said ring gear and said output shaft and the drive connection between said other hydrostatic unit and said output shaft.

6. The transmission set forth in claim 4 and said first mechanical drive means further including planetary gear means comprising a sun gear drivingly connected to said other hydrostatic unit, a ring gear and a carrier drivingly connected to said output shaft and carrying a pinion meshing with the sun gear and ring gear, said first drive establishing means comprising a brake operable to hold the ring gear of the last-mentioned planetary gear means, said second mechanical drive means including a gear train, said second drive establishing means comprising a clutch which is operable on engagement to establish drive through said gear train to effect the drive connection between said input shaft and said other hydrostatic unit.

7. The transmission set forth in claim 4 and said first mechanical drive means further including planetary gear means comprising a sun gear drivingly connected to said other hydrostatic unit, a ring gear drivingly connected to said output shaft and a carrier carrying a pinion meshing with the sun gear and ring gear, said first drive establishing means comprising a brake operable to hold the carrier of the last-mentioned planetary gear means, said second mechanical drive means including a gear train, said second drive establishing means comprising a clutch which is operable on engagement to establish drive through said gear train to effect the drive connection between said input shaft and said other hydrostatic unit.